United States Patent [19]

Nehl

[11] Patent Number: 4,875,578
[45] Date of Patent: Oct. 24, 1989

[54] CONTAINER FOR RECORD CARRIERS

[75] Inventor: Wolfgang Nehl, Waldachtal/Tumlingen, Fed. Rep. of Germany

[73] Assignee: fischerwerke Artur Fischer GmbH & Co. KG, Waldachtal/Tumlingen, Fed. Rep. of Germany

[21] Appl. No.: 233,275

[22] Filed: Aug. 17, 1988

[30] Foreign Application Priority Data

Aug. 22, 1987 [DE] Fed. Rep. of Germany ....... 3728113

[51] Int. Cl.$^4$ ............................................. B65D 85/57
[52] U.S. Cl. ..................................... 206/309; 206/444; 206/387
[58] Field of Search ............... 206/309, 444, 387, 307; 312/8, 9, 10, 12, 14, 15, 18, 19, 319, 345

[56] References Cited

U.S. PATENT DOCUMENTS 4,722,034 1/1988 Ackeret .......................... 312/12 X
4,747,484 5/1988 Ackeret .......................... 206/309 X Primary Examiner—Allen M. Ostrager
Attorney, Agent, or Firm—Michael J. Striker

[57] ABSTRACT

A container for record carriers, such as magnetic band cassettes, sound or image plates, compact discs and the like comprises a housing having lateral walls provided with longitudinal guides, the housing also having an open front end, at least one supporting element arranged in the housing, at least one slider arranged for receiving a record carrier and movable in the housing to a withdrawal position, the slider having lateral pins engaging in the longitudinal guides of the lateral walls of the housing, the longitudinal guides having at least one partial region which is provided an inclined guiding surface formed so that before reaching the withdrawal position a respective one of the pins slides along a respective one of the inclined guiding surfaces so as to press the slider against the supporting element.

11 Claims, 2 Drawing Sheets

Fig.1
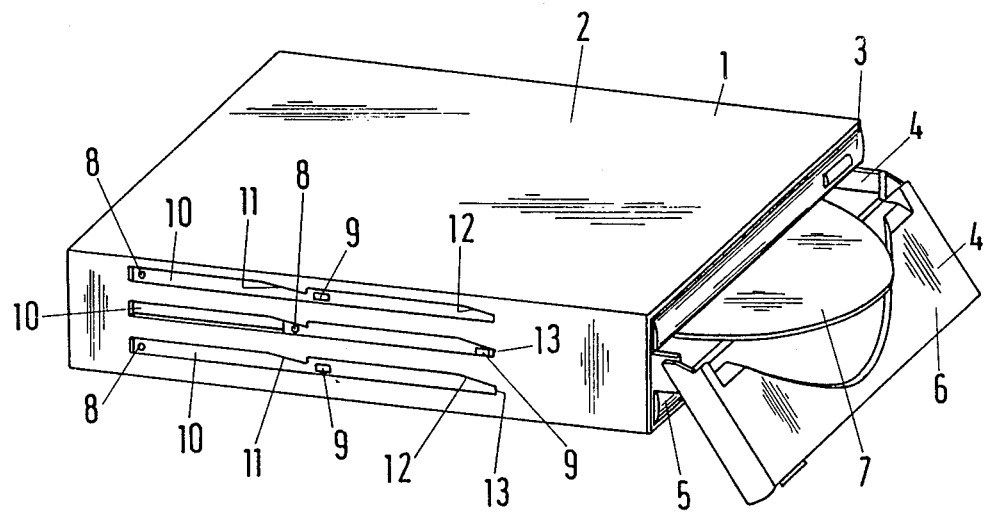
Fig.2
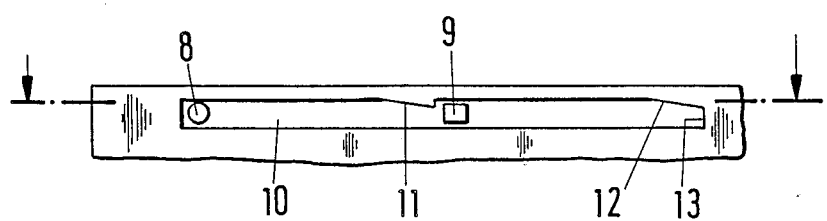
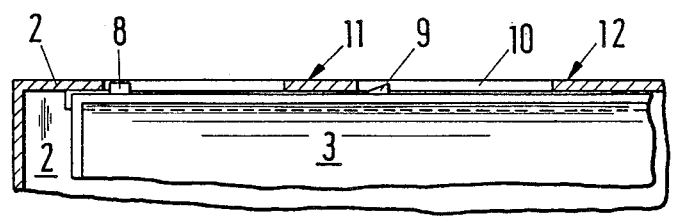
Fig. 3

Fig.4
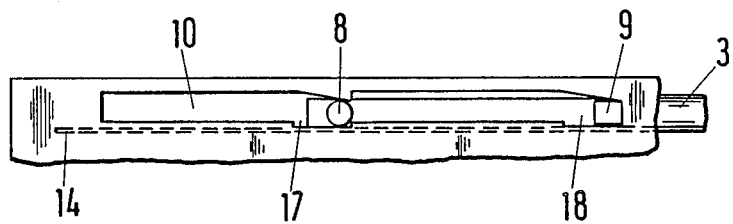
Fig.5
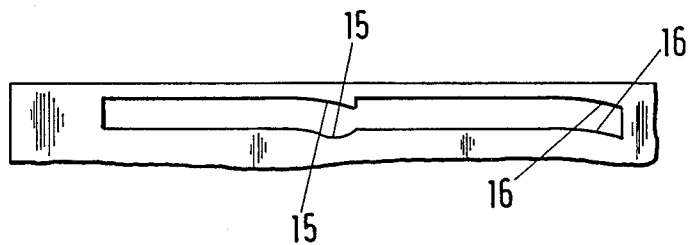
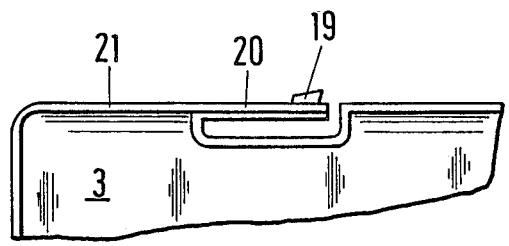
Fig.6

CONTAINER FOR RECORD CARRIERS

BACKGROUND OF THE INVENTION

The present invention relates to a container for record carriers.

Containers of the above mentioned general type are known in the art. In known containers for record carriers such as recording tape cassettes, compact discs and the like one or several sliders are arranged in a housing which is open at its one end. Each slider member can receive a record carrier and is displaceable against a spring force in the housing. By means of an arresting element, the slider is held in the inserted condition. Its front opening is closed on the housing opening in a flush manner. By actuating of an unlocking key, the slider is moved to the withdrawal position under the action of the spring force. The pins which are laterally mounted on the slider displace in longitudinal guides until they reach an abutment which determines the withdrawal position.

The known containers of this type possess frequently a disadvantage that the slider moves with a high speed to the withdrawal position, and thereby its lateral pins strike against the abutments with a corresponding high speed. The sudden braking in the withdrawal position causes vibrations and as a result undesirable noise.

SUMMARY OF THE INVENTION

Accordingly, it is an object of the present invention to prov___ _ _____ for record carrier, which avoids the disa_____ _ prior art.

More ___larly, an object of the present invention is a container for record carriers in which the slider is braked prior to reaching the withdrawal position.

In keeping with these objects and with others which will become apparent hereinafter, one feature of the present invention resides, briefly states, in that the longitudinal guides in the housing provided for guiding the pins of the slider have at least in the partial region an inclined guiding surface, over which a pin prior to reaching the withdrawal position slides and thereby the slider is pressed against a supporting element. The longitudinal guides which have the inclined surfaces in their partial regions act so that the pins are deviated from the main movement direction. Thereby the slider is pressed for example against the supporting strips which support the slider. The smaller in the inclination of the guiding surfaces, the softer is braking of the slider before reaching the abutment. The spring force which acts against the slider from its rear side in the longitudinal direction, acts in the region of the inclined guiding surfaces with a force which urges the slider against the supporting element. Because of friction which is produced between the supporting element and the slider, the desired braking is achieved.

In accordance with an advantageous embodiment of the invention, each side of the slider is provided with two pins which are spaced from one another in the longitudinal direction, and these pins prior to reaching of the withdrawal position slide uniformly along the inclined guiding surfaces to deviate the pins from the longitudinal direction. As a result of this, shortly before reaching the withdrawal position, the slider is displaced approximately parallel in the height and pressed uniformly against the supporting element which is formed as a rail or a strip. Thereby a uniform force distribution is produced.

The longitudinal guides with the inclined guiding surfaces can be formed as slots or grooves. Their upper and/or lower edges in a partial region form the inclined guiding surfaces. The guiding surfaces can be formed as inclines with a uniform inclination, or as curves.

The inclined guiding surfaces of the longitudinal guides are arranged before the abutment which determines the withdrawal position in such a manner that each pin does not stop prior to reaching the abutment. The pin strikes with a minimal speed against the abutment, so that with the utilization of the inventive inclined guiding surfaces definite withdrawal position is provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view showing a container for record carriers in accordance with the present invention;

FIG. 2 is a side view of the container for record carriers, shown in FIG. 1;

FIG. 3 is a view showing a section taken along the line A–B in FIG. 2;

FIG. 4 is a view showing another embodiment of longitudinal guides of the inventive container, with inclined guiding surfaces;

FIG. 5 is a view showing still a further embodiment of the longitudinal guides with the inclined guiding surfaces, of the inventive container; and FIG. 6 is a view showing a slider in accordance with a further embodiment, with springy tongues.

DESCRIPTION OF THE PREFERRED EMBODIMENTS

A container for record carriers shown in FIG. 1 is identified with reference numeral 1 and has a housing 2 and three sliders 3, 4, 5. The central slider 4 is located in a withdrawal position. Its front part 6 is bent downwardly, so that a compact disc 7 inserted in it can be conveniently withdrawn. Each of the sliders 3, 4, 5 includes lateral pins 8 and 9 which engage in longitudinal guides 10. The guide can be formed as openings or slots.

As can be seen from FIG. 2, each longitudinal guide 10 is provided in its partial regions with guiding surfaces 11 and 12. During displacement of the pins 8 and 9 shortly before reaching the withdrawal position of the respective slider, the pins come to abutment against the guiding surfaces 11 and 12 and are pressed downwardly. Upon reaching the withdrawal position, the respective front pin 9 abuts against an abutment 13 of the longitudinal guide. The longitudinal guides 10 with the inclined surfaces 11 and 12 and the abutment 13 are shown in FIG. 2 on an enlarged scale.

FIG. 3 shows a cross-section taken along the cutting line in FIG. 2. The longitudinal guide 10 which is formed in the side wall of the housing 2 has in its partial regions the inclined surfaces 11 and 12. Two different pins 8 and 9 project laterally from the sliders 3 and engage in the longitudinal guide 10. The slider 3 lies on a supporting element 4 which extends under the longitudinal guide 10. The supporting element is a strip which is formed on the inner side of the housing 2. On a not shown opposite side of the housing 2, corresponding longitudinal guides and corresponding supporting elements are associated with the sliders 3, 4, 5.

The pin 9 corresponds in its shape to the vertical abutment surface of the abutment 13 and abuts against the latter in the withdrawal position. Upon reaching the withdrawal position, the pins 8 and 9 contact the associated guiding surfaces 11 and 12. Thereby the slider 3 is pressed in a substantially parallel manner downwardly against the supporting element 14. The friction which is produced in this manner brakes the slider. Thereby the pin 9 does not strike against the abutment 13 with its full inertia force.

FIGS. 4 and 5 show two different embodiments of the inclined guiding surfaces. In FIG. 4 the guiding surfaces are provided with constant inclination. In FIG. 5 the guiding surfaces 15 and 16 are formed as curves. In the embodiment of FIG. 4, recesses 17 and 18 are provided under the inclined guiding surfaces 11 and 12 and allow an unobstructed sinking of the pins 8 and 9. Thereby the vertical pressing of the sliders 3 against the supporting element 14 is not hindered.

The housing 2 and the sliders 3, 4, 5 are composed preferably of a synthetic plastic material. The supporting elements 14 formed as ribs are also composed of the same material. Since a synthetic plastic material possesses an adequate elasticity, the above described pressing of the slider against the strips before reaching the withdrawal position provides for a soft braking of the slider movement. It is also noted that the inclined guiding surfaces can also be directed upwardly, contrary to the shown construction, since abutment surfaces comparable with the supporting elements 14 can then be formed above the sliders 3, 4, 5 for providing braking of the sliders as a result of a friction.

FIG. 6 shows a slider 3 with a springy, horizontally deflectable tongue 19. The tongue 19 is located on an end of a web 20 which extends along a side wall 21 of the slider. The web 20 which is composed for example of a synthetic plastic material has an adequate elasticity to produce an elastic deflection of the tongue 19 in the region of the guiding surfaces 12. Thereby the friction force which is produced before reaching the abutment is limited and the slider is held in the withdrawal position in a play-free manner.

It will be understood that each of the elements described above, or two or more together, may also find a useful application in other types of constructions differing from the types described above.

While the invention has been illustrated and described as embodied in a container for record carriers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A container for record carriers, such as magnetic band cassettes, sound or image plates, compact discs and the like, comprising a housing having lateral walls provided with longitudinal guides, said housing also having an open front end; at least one supporting element arranged in said housing; at least one slider arranged for receiving a record carrier and movable in said housing to a withdrawal position, said slider having lateral pins engaging in said longitudinal guides of said lateral walls of said housing, said longitudinal guides having at least one partial region provided an inclined guiding surface formed so that before reaching said withdrawal position a respective one of said pins slides along a respective one of said inclined guiding surfaces so as to press said slider against said supporting element.

2. A container as defined in claim 1; and further comprising spring means arranged to displace said at least one slider to said withdrawal position.

3. A container as defined in claim 1, wherein each of said side walls of said housing is provided with two such guiding surfaces spaced from one another in a longitudinal direction, each side of said slider being provided with two such pins which are spaced from one another in the longitudinal direction so that before reaching said withdrawal position both pins on each side of said slider deviate from a longitudinal direction along both inclined guiding surfaces on each wall of said housing in a uniform fashion.

4. A container as defined in claim 1, wherein said longitudinal guides with said inclined guiding surfaces are formed as slots.

5. A container as defined in claim 1, wherein said longitudinal guides with said inclined surfaces are formed as grooves.

6. A container as defined in claim 1, wherein said longitudinal guides have upper edges provided with said inclined guiding surfaces.

7. A container as defined in claim 1, wherein said longitudinal guides have lower edges provided with said inclined guiding surfaces.

8. A container as defined in claim 1, wherein said inclined surfaces of said longitudinal guides are formed as inclines with a uniform inclination.

9. A container as defined in claim 1, wherein said guiding surfaces of said longitudinal guides are formed as curves.

10. A container as defined in claim 1, wherein each of said longitudinal guides has an end which faces towards said front end of said housing and forms an abutment which limits a movement of said slider in said withdrawal position and against which a respective one of said pins abuts in said withdrawal position.

11. A container as defined in claim 1, wherein each of said pins is arranged on said slider in a springy deflectable manner.

* * * * *